Oct. 6, 1970   SHIRO KANAO   3,532,580
METHOD AND APPARATUS FOR CONTINUOUSLY MANUFACTURING
SYNTHETIC RESIN PIPE
Filed Oct. 28, 1966   9 Sheets-Sheet 2

INVENTOR.
SHIRO KANAO
BY
Bacon & Thomas
ATTORNEYS

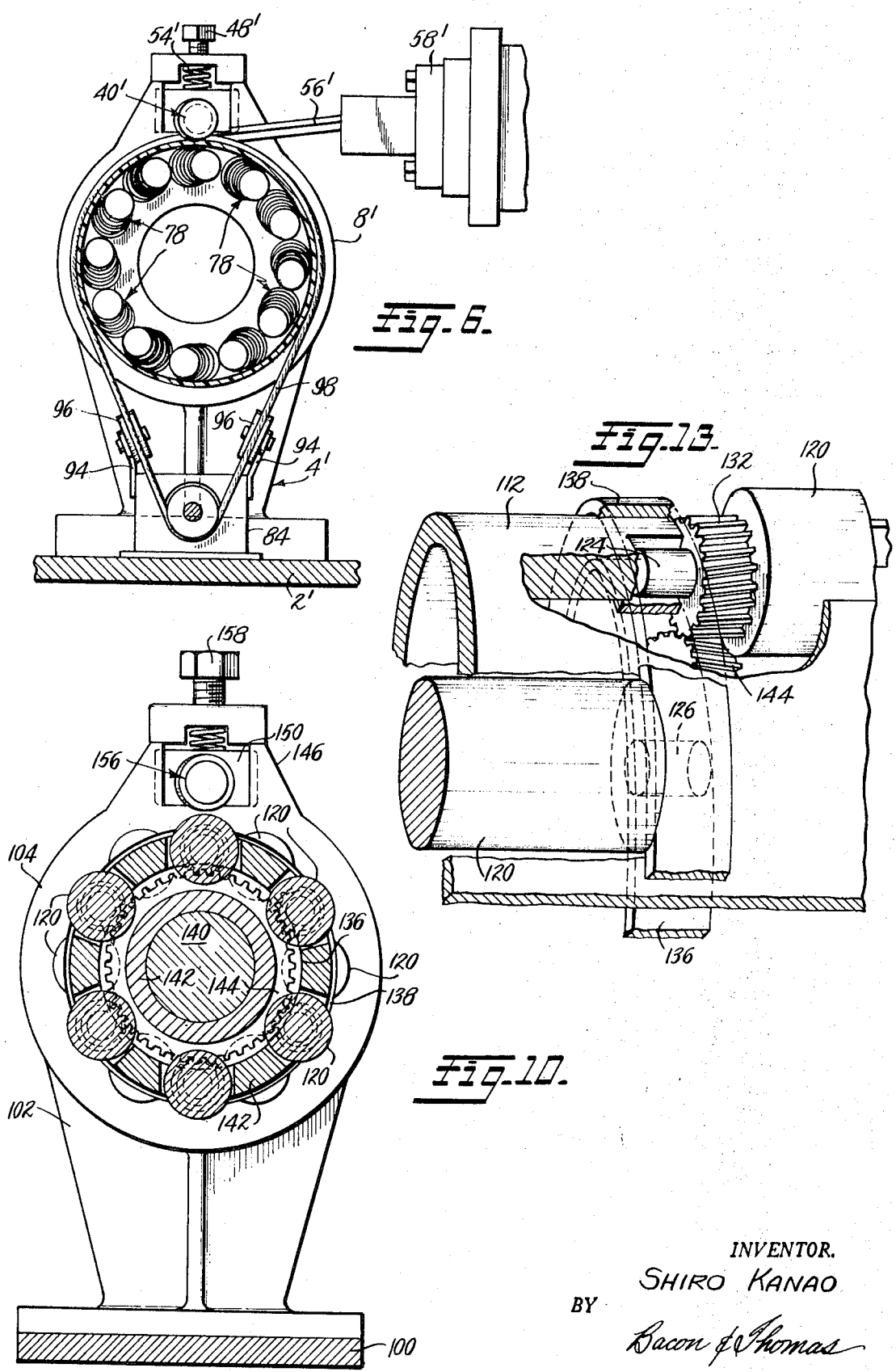

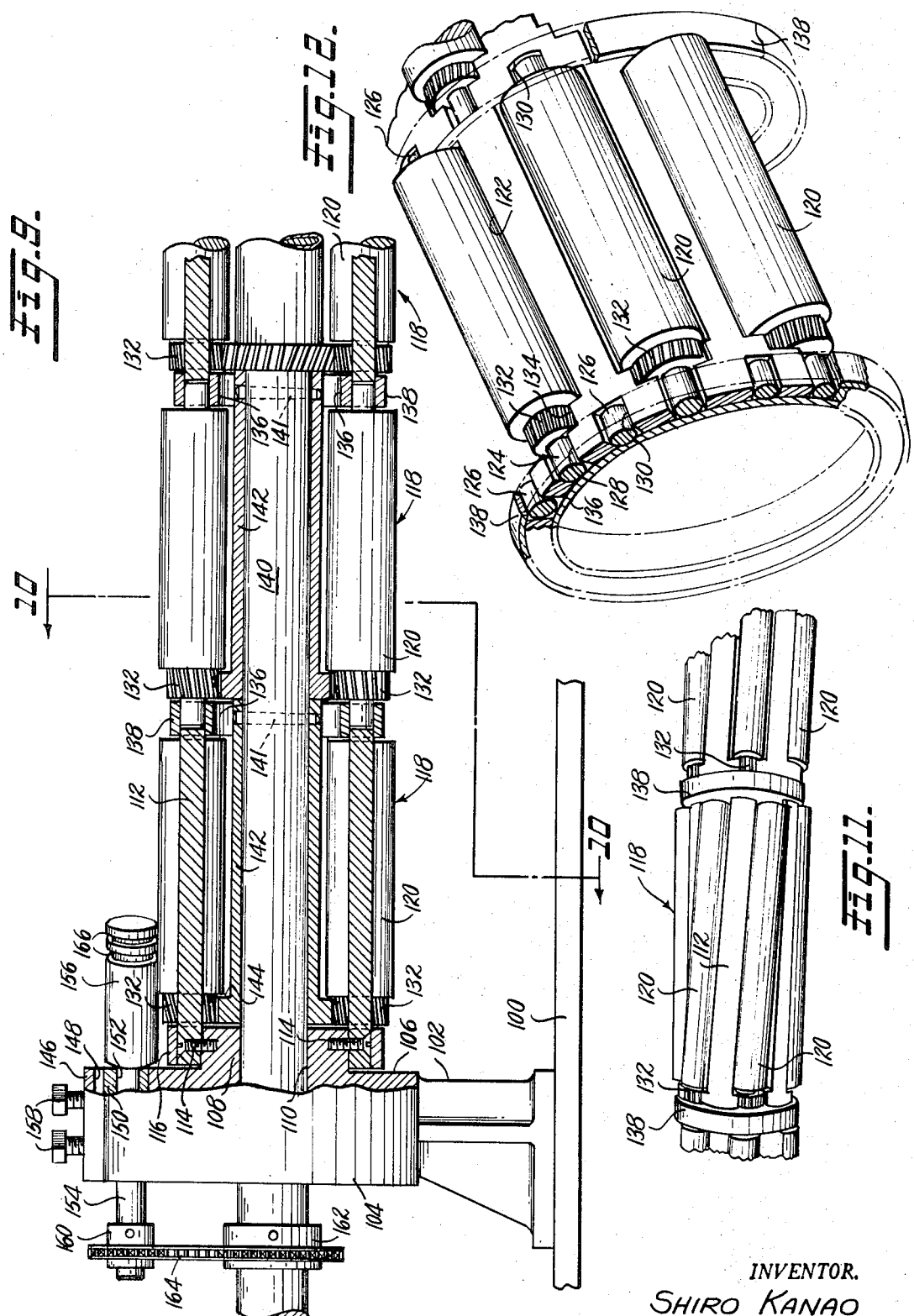

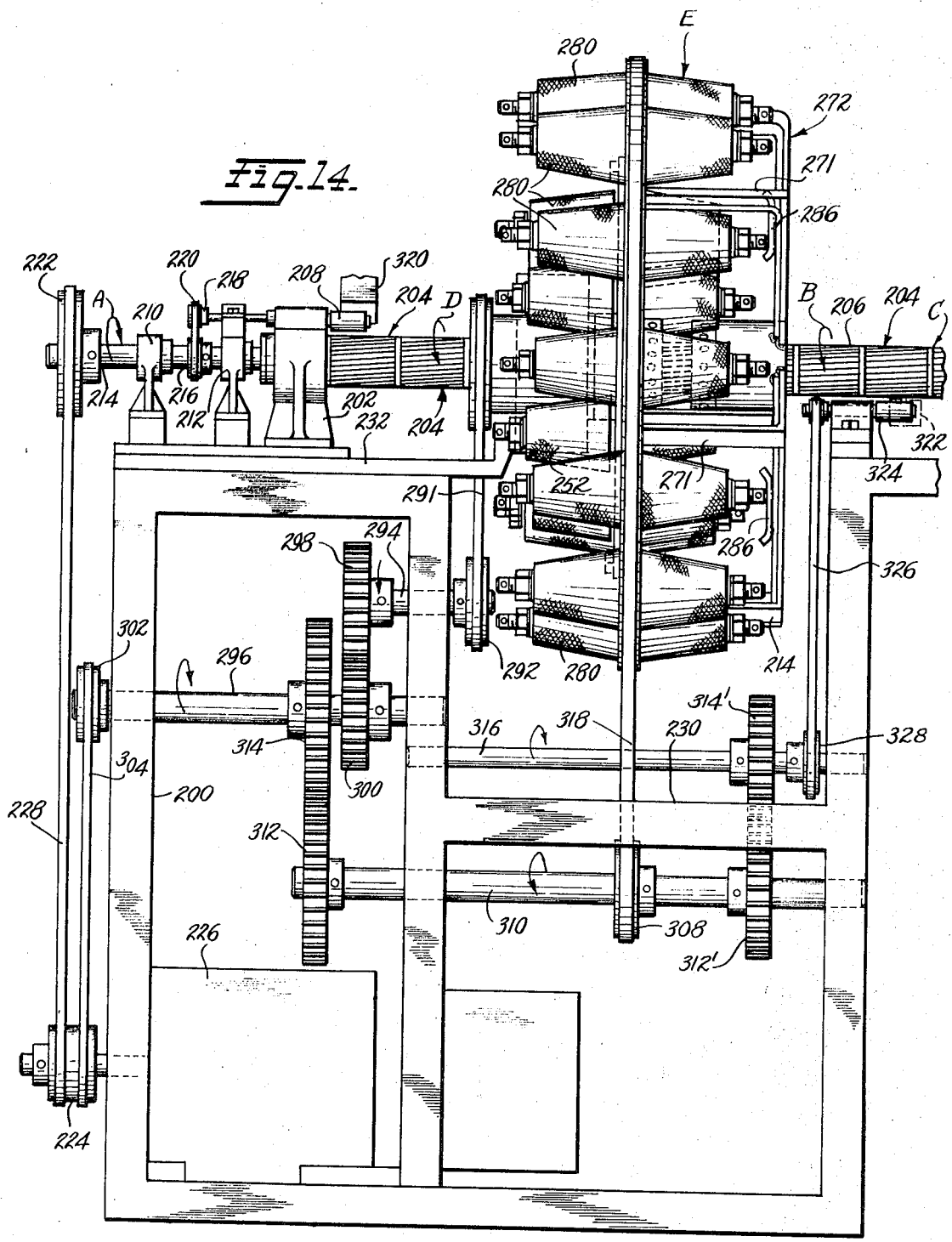

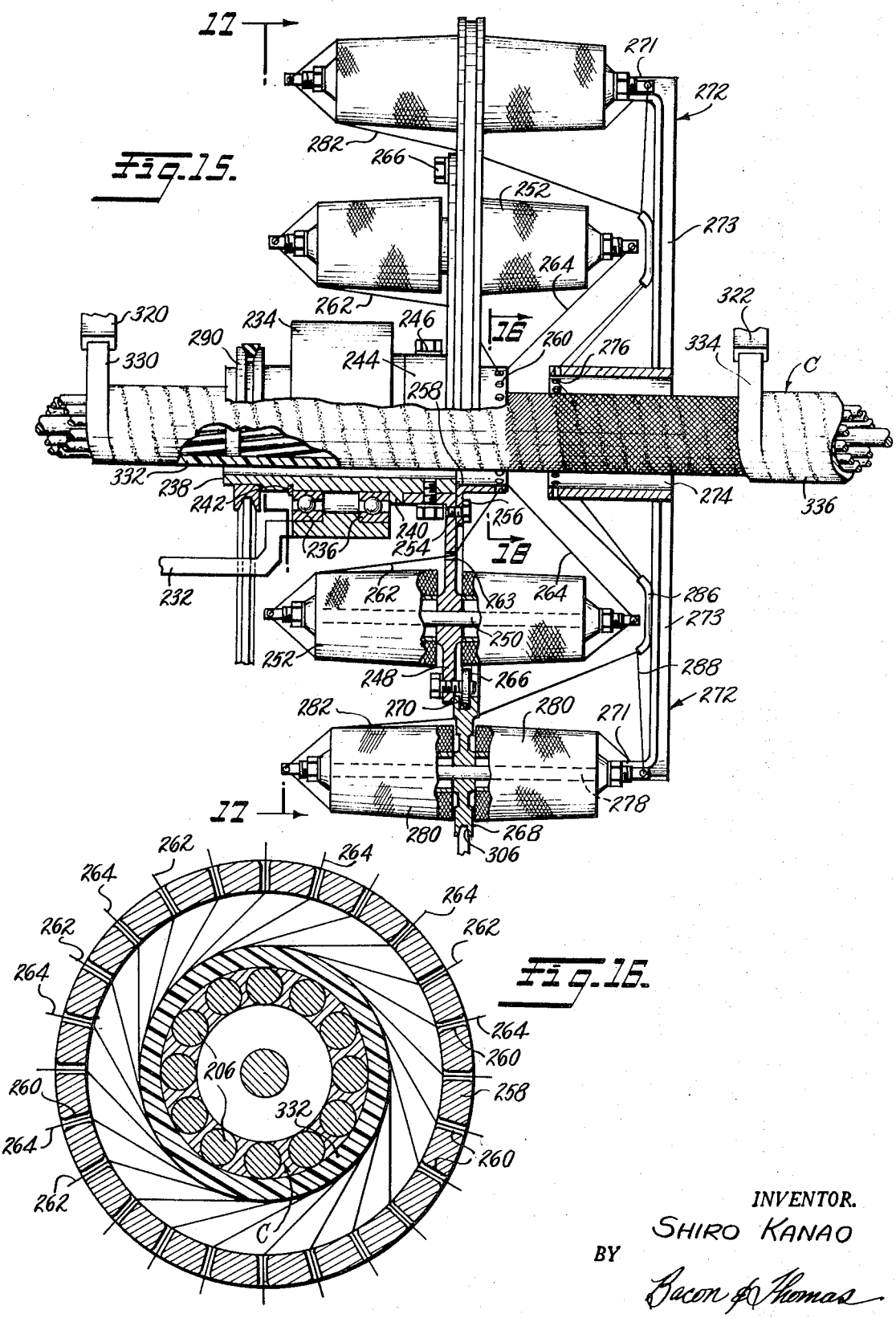

Oct. 6, 1970  SHIRO KANAO  3,532,580
METHOD AND APPARATUS FOR CONTINUOUSLY MANUFACTURING
SYNTHETIC RESIN PIPE
Filed Oct. 28, 1966  9 Sheets-Sheet 9
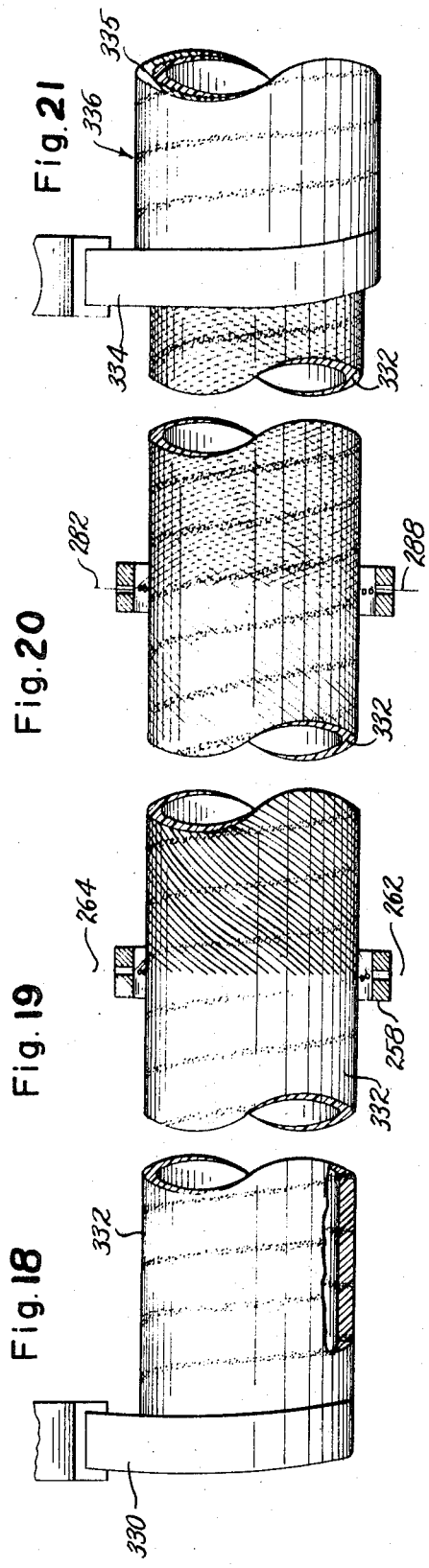
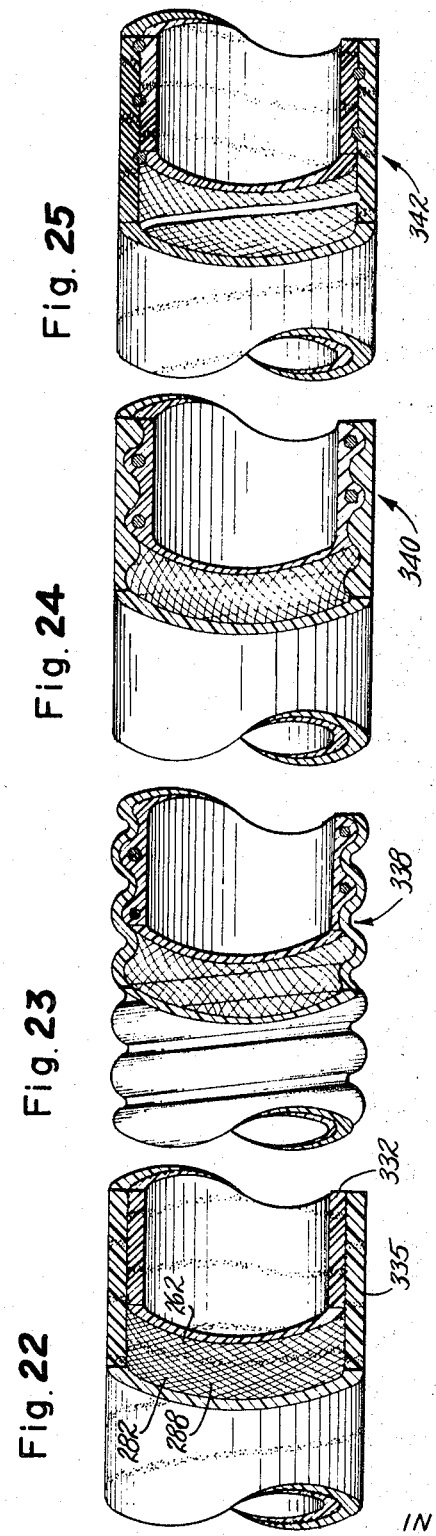
INVENTOR
SHIRO KANAO
BY Bacon & Thomas
ATTORNEYS United States Patent Office 3,532,580
Patented Oct. 6, 1970

3,532,580
METHOD AND APPARATUS FOR CONTINUOUSLY MANUFACTURING SYNTHETIC RESIN PIPE
Shiro Kanao, 12-ban 4-go, Ibaragi-shi, Osaka-fu, Takehashi-cho, Japan
Filed Oct. 28, 1966, Ser. No. 590,385
Claims priority, application Japan, Nov. 15, 1965, 40/70,410, 40/70,411, 40/93,094; Jan. 8, 1966, 41/882, 41/883; Apr. 4, 1966, 41/21,417
Int. Cl. B65h 81/00
U.S. Cl. 156—432                    10 Claims This invention relates to a method for the continuous manufacturing of synthetic resin pipe, including the combined steps of drawing a strip of continuously extruded synthetic resin material helically along a generally cylindrical surface and welding the adjoining lateral edges of the strip of material in overlapping relation, and to apparatus for practicing the method.

It is an object of the present invention to provide a method for continuously manufacturing in any desired length synthetic resin pipe having a longitudinal sectional form with uneven diametral dimensions repeating at intervals in the longitudinal direction, such as would normally require a special forming mold to manufacture.

A further object is to provide a compact apparatus for the continuous manufacturing of a pipe from a strip of soft extruded synthetic resin, said apparatus including a plurality of short rollers along which the pipe is drawn as it is manufactured and being designed to ensure that the manufactured pipe will harden without resultant distortions therein.

Still another object is to provide an apparatus for continuously manufacturing synthetic resin pipe with no fluctuation in the effective diameter of the pipe throughout the length thereof.

It is also an object to provide an apparatus for the continuous manufacturing of synthetic resin pipe by helically winding a strip of soft extruded resin material about a generally cylindrical surface and welding the lateral edges of said strip in overlapping relationship, which apparatus is constructed to keep the pitch of the helically wound strip of material substantially constant, and to prevent the placing of strain in the longitudinal direction on the relatively soft pipe before such has hardened.

Yet another object is to provide an apparatus for the continuous manufacturing of synthetic resin pipe wherein a strip of continuously extruded resin material is positively and uniformly drawn and wound along a helical path, which apparatus is designed to ensure manufacture of pipe with no distortions therein.

Still another object is to provide an apparatus for the continuous manufacturing of synthetic resin pipe, constructed to prevent accidental variation in the diameter of the pipe because of gradual shrinkage occurring during cooling off of the heated synthetic resin material from which the pipe is manufactured.

A still further object is to provide an apparatus for the continuous manufacturing of synthetic resin pipe, with provisions for preventing any stresses present in the pipe being manufactured from acting on the apparatus to the damage thereof, thus ensuring stable operation and long life of the apparatus.

It is also an object to provide a method and apparatus for continuously manufacturing strong and yet highly flexible synthetic resin pipe having reinforcement threads embedded within the pipe wall.

In the method for continuously manufacturing pipe with reinforcement threads embedded therein, it is particularly an object to provide a method which makes it possible to manufacture pipe similar to that which is now made by fixing a tubular netting comprised of a plurality of reinforcement threads over a base pipe portion before applying a resin layer to the base, but which eliminates the use of such a tubular netting.

Yet another object is to provide a highly compact apparatus for continuously manufacturing synthetic resin pipe having reinforcement threads embedded within the pipe wall.

Other objects and many of the attendant advantages of the invention will become readily apparent from the following detailed description, when taken in conjunction with the accompanying drawings, wherein:

FIG. 4 is a side elevational view, partly in section, of a portion of synthetic resin pipe manufactured by the apparatus of FIG. 1;

FIG. 6 is a vertical sectional view taken on the line 6—6 in FIG. 5;

FIG. 7 is an enlarged perspective view of one of the inner rollers of FIG. 5;

FIG. 8 is an axial sectional view of a portion of a pipe manufactured by the apparatus of FIGS. 5–7;

FIG. 9 is a fragmentary side elevational view, partly in section, of a third embodiment of the apparatus for manufacturing a synthetic resin pipe, incorporating a plurality of sets of inner rollers mounted on a stationary tubular frame;

FIG. 10 is a vertical sectional view taken on the line 10—10 in FIG. 9;

FIG. 11 is a fragmentary pictorial side elevational view of one of the inner roller sets of FIGS. 9, showing the angled disposition of the individual rollers;

FIG. 12 is an enlarged, fragmentary perspective view showing how the inner rollers of the embodiment of FIG. 9 are mounted on the tubular frame;

FIG. 13 is a view similar to FIG. 12, further showing how the inner rollers are mounted;

FIG. 14 is a side elevational view of the apparatus of the invention for manufacturing a layered synthetic resin pipe having reinforcement threads between the layers thereof;

FIG. 15 is an enlarged side elevational view, partly in section, of the bobbin assembly of FIG. 14;

FIG. 16 is an enlarged vertical sectional view taken along the line 16—16 in FIG. 15;

FIGS. 18–21 are enlarged side elevational views showing the various stages of the instant process for manufacturing layered synthetic resin pipe having reinforcement threads between the layers thereof;

FIG. 22 is an enlarged view, partially broken away, of a layered, reinforced pipe manufactured by the apparatus of FIGS. 14–17; and FIGS. 23–25 are elevational views, partly in section, of other examples of layered, reinforced pipe that can be manufactured with the apparatus of the invention.

Figure 1:
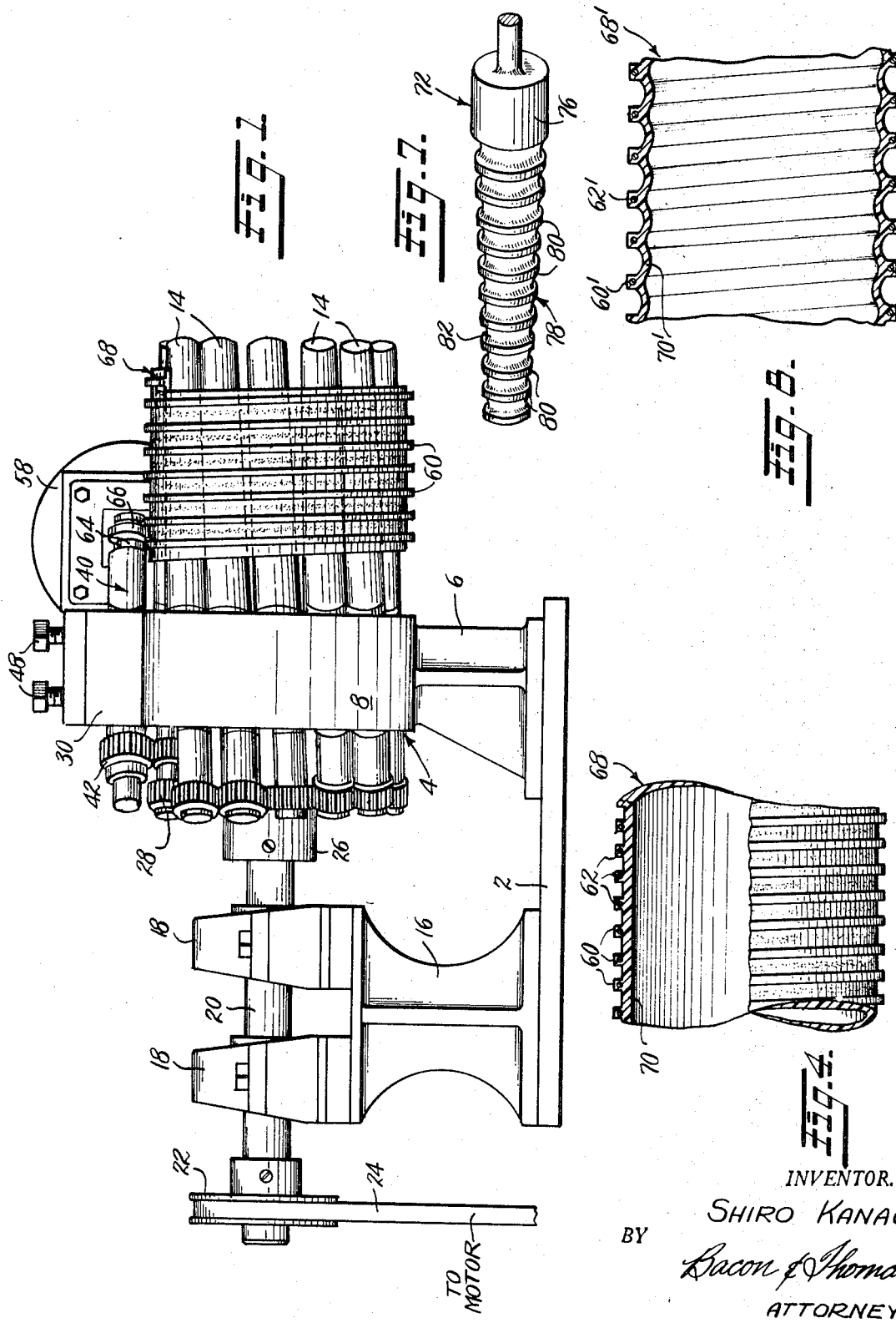
FIG. 1 is a side elevational view of a first embodiment of the apparatus for continuously manufacturing a synthetic resin pipe, a section of pipe being disposed thereon.
Figure 2:
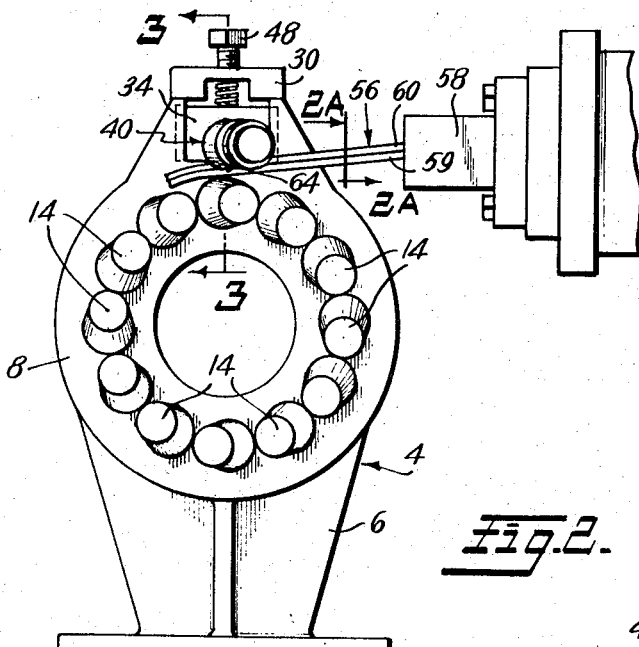
FIG. 2 is an end elevational view of the apparatus of FIG. 1, showing the inner and outer rollers and the manner in which a strip of extruded material is fed thereto.
Figure 3:
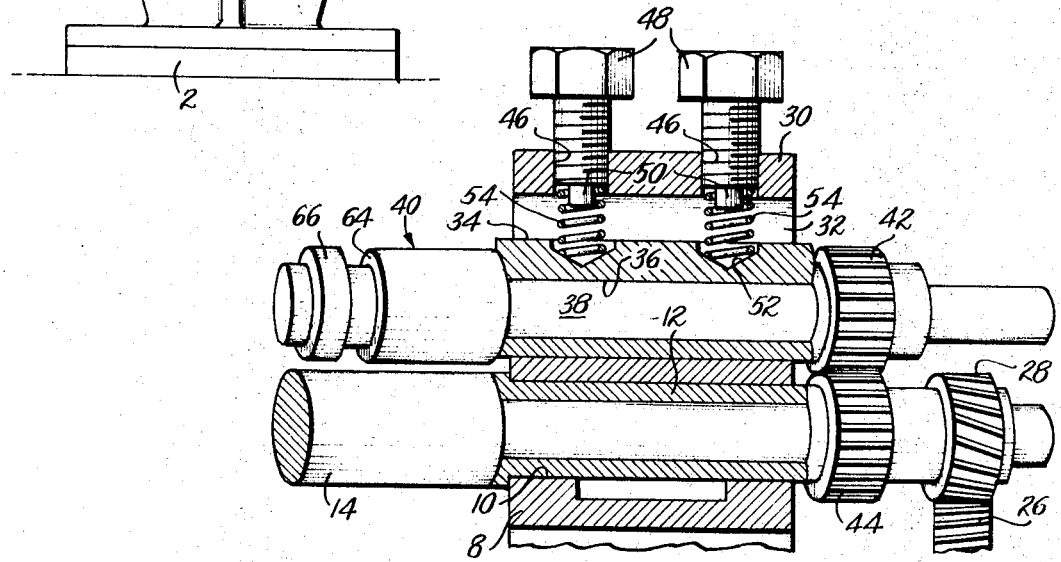
FIG. 3 is an enlarged fragmentary sectional view taken on the line 3—3 in FIG. 2, showing the mounting arrangement for the outer or pressure roller.

Referring now to FIGS. 1–3 of the drawings, a base plate 2 is shown having a bracket 4 mounted thereon, said bracket including a base 6 and a generally cylindrical hollow frame 8. The frame 8 has an annular array of bores 10 extending therethrough, and journaled within each of the bores 10 is the inner end portion 12 of an inner roller 14. The annular array of inner rollers 14 inscribe an imaginary generally cylindrical surface extending forwardly from the frame 8, and each of said rollers is mounted for rotation about an axis which is slightly oblique in the peripherial direction relative to a longitudinal axis passing through the center of the hollow frame 8, as shown best in FIG. 2. The inner rollers 14 taper slightly from adjacent the frame 8 to the outer ends thereof, and have a smooth, uninterrupted surface.

Positioned rearwardly of the bracket 4 on the base plate 2 is a standard 16, on which is mounted a pair of spaced bearings 18. A shaft 20 is carried by the bearings 18, and has a pulley 22 secured to the rear end thereof for receiving a belt 24 leading from a suitable motor (not shown). The shaft 20 is aligned with the longitudinal central axis of the frame 8, and has a hyperboloidal driving gear 26 on the forward end thereof. The inner end of each of the inner rollers 14 has a hyperboloidal gear 28 mounted thereon, the gears 28 all being in mesh with the driving gear 26 so that when the shaft 20 is rotated in one direction, all of the inner rollers 14 will simultaneously be rotated at identical speeds in the opposite direction.

The top of the frame 8 has an extension 30 thereon, through which extends a rectangular opening 32. Received within the opening 32 is a rectangular journal block 34 having a cylindrical bore 36 extending therethrough, the axis of the cylindrical bore 36 extending substantially parallel to the axis of the top-most of the bores 10, lying directly therebeneath. Journaled within the cylindrical bore 36 is the reduced inner end portion 38 of an outer pressure roller 40, the inner end of the roller 40 having a spur gear 42 mounted thereon. A mating spur gear 44 is mounted on the inner end of the top-most inner roller 14, between the gear 28 mounted thereon and the frame 8, the spur gears 42 and 44 being arranged so that when the drive shaft 20 is rotated the outer roller 40 will be rotated in a direction opposite to the inner rollers 14. The housing extension 30 has a pair of spaced threaded bores 46 through the top thereof, within which are received bolts 48 having reduced cylindrical portions 50 on the lower end thereof. The top surface of the rectangular journal block 34 has a pair of spaced recesses 52 therein, disposed directly beneath the bores 46. The lower ends of a pair of compression springs 54 are seated in the recesses 52, the upper ends of said compression springs being seated on the reduced cylindrical portions 50 of the bolts 48. The bolts 48 and the springs 54 function to resiliently urge the block 34 downwardly to hold the spur gears 42 and 44 in engagement and to urge the pressure roller 40 toward the top-most inner roller 14, and at the same time allow vertical movement of the outer pressure roller 40 away from the opposed, top-most inner roller 14 should this prove necessary to avoid damage to the apparatus.

Figure 2A:
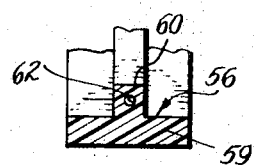
FIG. 2A is an enlarged sectional view, taken on the line 2A—2A in FIG. 2, through the strip of extruded resin material.

The apparatus of FIGS. 1–3 is intended to receive a strip 56 of not fully hardened synthetic resin material supplied continuously from an extruder 58, and functions to form said strip into a generally cylindrical helically wound pipe. The strip 56 is shown in cross-section in FIG. 2A, and includes a generally rectangular base portion 59 having a rectangular reinforcing rib 60 formed centrally thereon, whereby said strip 56 is substantially T-shape in cross-section. Embedded within the rib 60 is a reinforcement wire 62, which can be of hardened synthetic resin or some other suitable material. The outer pressure roller 40 has a generally cylindrical surface, and is provided with a rectangular annular groove 64 for receiving the rib 60 on the strip of material 56. The resiliently mounted outer pressure roller 40 is spaced slightly from the opposing top-most inner roller 14, and functions to weld together the overlapping lateral edges of the continuously extruded, not fully hardened resin strip 56 as said strip is being helically wound on the inner rollers 14, to thereby form said strip into a pipe.

In operation the shaft 20 is driven by the belt 24, whereby the inner rollers 14 are uniformly driven at the same speed in a counter-clockwise direction, as viewed in FIG. 2, and the outer pressure roller 40 is driven at the same speed in a clockwise direction. The not fully hardened strip 56 of synethetic resin material is continuously delivered from the extrusion die 58, and is fed from a peripheral tangential direction onto the imaginary cylindrical surface defined by the annular array of inner rollers 14. The strip of material 56 passes between the outer pressure roller 40 and the top-most of the inner rollers 14 with the rib 60 thereon being received in the annular groove 64, the strip 56 being fed onto the annular array of inner rollers 14 in a helical manner with the forward lateral edge thereof overlapping the rearward lateral edge of the preceding layer in the region beneath the outer end 66 of the outer roller 40. As the not fully hardened strip of material 56 is continuously fed onto the constantly rotating inner rollers 14, the outer end 66 of the outer roller 40 exerts pressure on the overlapped edges thereof to effect a weld therebetween, thus forming a pipe 68.

After leaving the region of the outer roller 40 the pipe 68 is guided peripherally along the imaginary generally cylindrical surface defined by the continuously rotating inner rollers 14, and moves axially away from the frame 8. The constantly rotating, obliquely disposed, gently tapering inner rollers 14 serve to smoothly move the pipe 68 without distorting the same and without placing stresses thereon. The pipe 68 is in a relatively soft and easily deformed state immediately upon leaving the outer roller 40, and the inner rollers 14 are of sufficient length so that the pipe is supported thereby until it has hardened sufficiently so that the dimensions thereof are stable. Thus, the apparatus of FIGS. 1–3 functions to continuously manufacture a synthetic resin pipe 68 that is substantially free of distortion and internal stresses, and that is substantially uniform in dimensions and configuration.

A section of the pipe 68 manufactured by the apparatus of FIGS. 1–3 is shown in enlarged, partially broken away view in FIG. 4. The pipe 68 comprises a generally cylindrical side wall 70 of uniform configuration and dimensions, the rib 60 and the reinforcement 62 embedded therein forming a helically extending reinforcement about said side wall.

Figure 5:
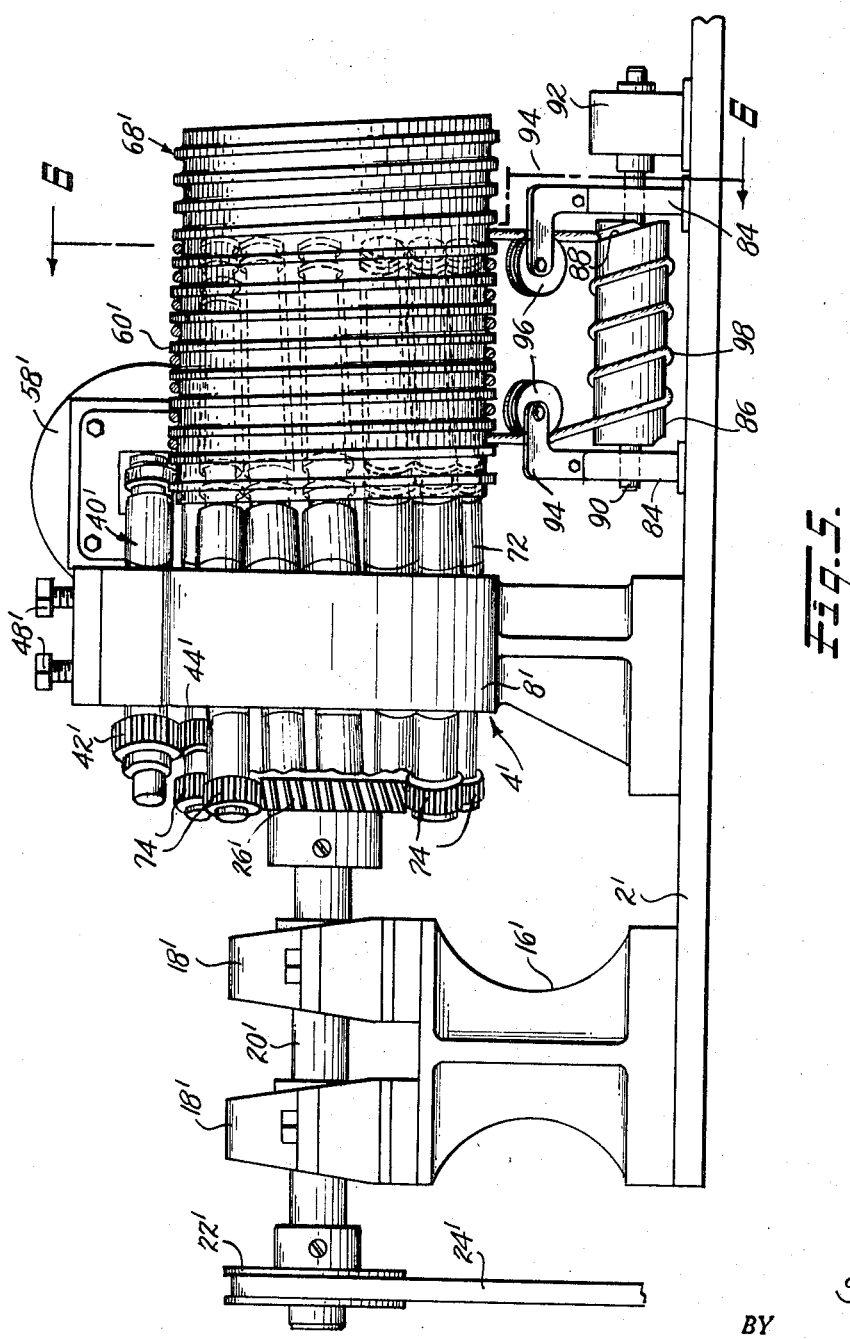
FIG. 5 is a side elevational view of a second embodiment of the apparatus of the invention, incorporating an endless cord device to facilitate forming of the helical pipe.
Figure 17:
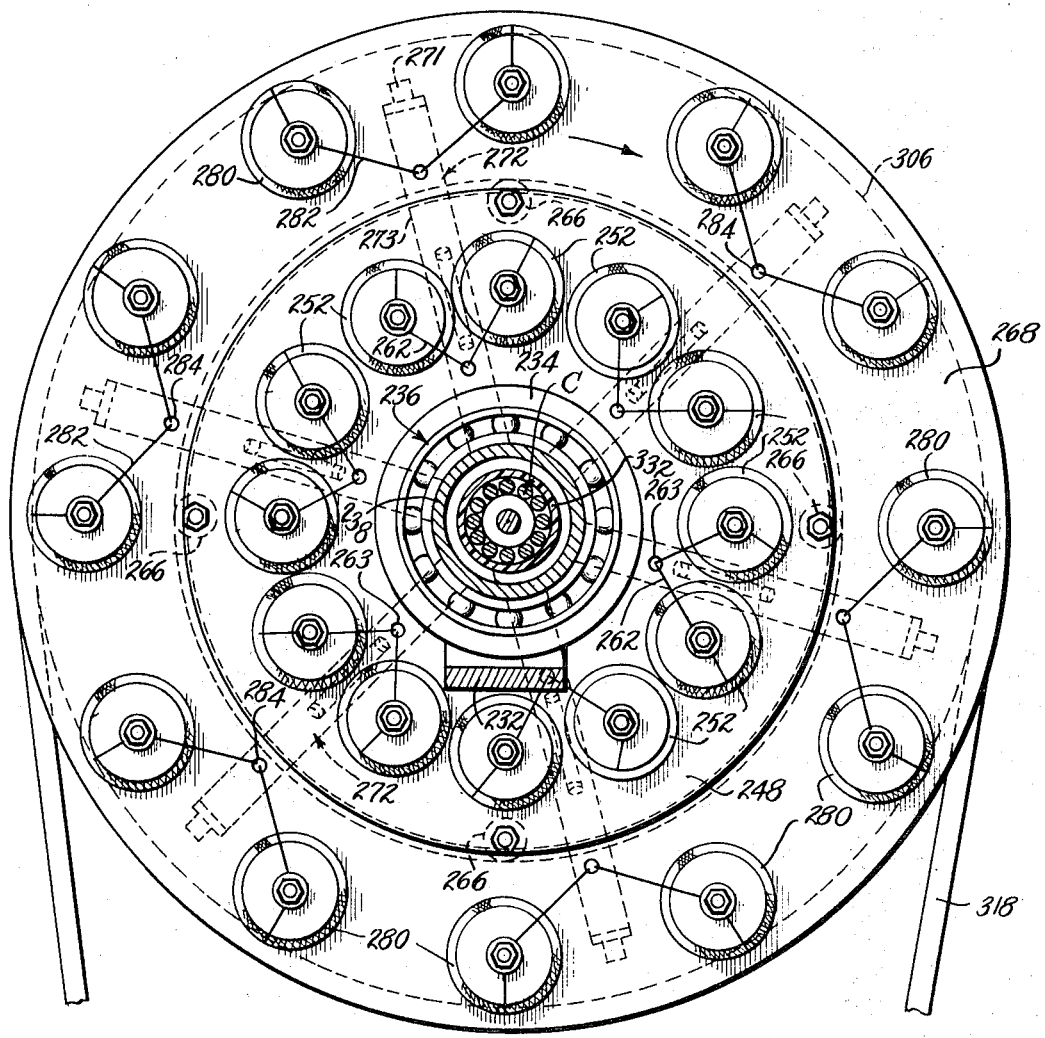
FIG. 17 is a sectional view taken along the line 17—17 in FIG. 15, showing the arrangement of the bobbins.

A modification of the apparatus of FIGS. 1–3 is shown in FIGS. 5 and 6, wherein a base plate 2' has a bracket 4' mounted thereon identical to the bracket 4, said bracket 4' supporting an annular array of inner rollers 72 mounted and disposed identically to the inner rollers 14 to define an imaginary, generally cylindrical surface. Each of the inner rollers 72 has a hyperboloidal gear 74 on the inner end thereof corresponding to the gears 28 in FIG. 1, the gears 74 being in mesh with a hyperboloidal driving gear 26' carried on the forward and of a drive shaft 20' mounted in bearing 18' carried by a standard 16' secured to the base plate 2'. The shaft 20' has a pulley 22' on the rear end thereof driven by a belt 24' leading from a motor (not shown), and the shaft 20' and the gears 26' and 74 function to drive the inner rollers 72 in the same manner as the inner rollers 14.

An outer roller 40' is mounted above the top-most of the inner rollers 72 in the same manner as the outer roller 40, and is driven by a spur gear 42' from a spur gear 44' mounted on the inner end of the top-most of the inner rollers 72. The pressure with which the outer roller 40' is urged toward the top-most of the inner rollers 72 is adjusted by a pair of screws 48' and springs 54', in the same manner as for the outer pressure roller 40.

The portion of the inner rollers 72 extending forwardly from the frame 8' is of a different configuration than the forward portion of the inner rollers 14 in FIG. 1, one of the inner rollers 72 being shown in perspective in FIG. 7. Each of the inner rollers 72 includes a smooth cylindrical portion 76 immediately adjacent the frame 8 that extends for about the length of the outer pressure roller 40', and a gently tapering outer portion 78 having a plurality of spaced annular cylindrical ribs 80 thereon separated by rounded annular grooves 82. The annular grooves 82 on each inner roller 72 are axially displaced from the corresponding annular grooves 82 on the inner roller immediately therebefore by the amount of axial advancement of the strip of continuous synthetic resin material from which the pipe is formed, during the travel of said strip between said two rollers.

The base plate 2' extends forwardly from the bracket 4', and mounted thereon is a pair of spaced vertical brackets 84 between which is journaled a cylindrical roller 86 having a helical groove 88 formed in the outer surface thereof, the roller 86 being supported by a shaft 90 which is connected to be driven by a motor 92. An L-shaped arm 94 extends upwardly at an angle to the vertical from each of the standards 84, and the inwardly directed horizontal legs of said arms 94 have pulleys 96 mounted thereon. A continuous cord 98 is wrapped about the roller 86 and is received within the helical groove 88, said cord passing over the pulleys 96 and being wrapped about the pipe 68' being manufactured by the apparatus so that the cord is received between each of the annular ribs 60' on the helically wound pipe over the major length of the portion 78 of the inner rollers 72. The continuous cord 98 is driven by the motor 92 so that it moves at the same speed as the speed of rotation of the pipe 68', and tends to pull the overlapped edges of the helically wound strip of material 56' into the annular grooves 82 on the inner rollers 72.

The pipe 68' is thus positively moved in the axial direction away from the frame 8' by the inner rollers 72 and the outer roller 40', and by the constantly driven continuous cord 98. The axial movement of the manufactured pipe 68' can therefore be controlled within very precise limits. Moreover, the continuously moving cord 98 functions with the annular grooves 82 on the inner rollers 72 to ensure uniform overlapping of the lateral edges of the helically wound strip of material 56', thus helping to ensure a uniform product. The combined driving effect of the inner rollers 72, the outer roller 40', and the continuously driven endless cord 98 enables the apparatus of FIGS. 5 and 6 to manufacture pipe at a speed substantially faster than the apparatus of FIGS. 1–3, without causing any distortion or internal stresses in the finished product.

A portion of a pipe 68' manufactured by the apparatus of FIGS. 5–7 is shown in axial section in FIG. 8, wherein it is seen that said pipe 68' is similar in configuration to the pipe 68 except that the cylindrical wall 70' thereof is undulated as a result of the engagement thereof with the rounded annular grooves 82 and the helically wound endless cord 98. The undulated cylindrical surface 70' has a helical reinforcing rib 60' extending therearound, which rib 60' has reinforcement 62' embedded therein.

Referring now to FIGS. 9–13, still another embodiment of the invention is shown, incorporating a plurality of sets of inner rollers carried by a stationary tubular frame. Mounted on a base plate 100 is bracket 102 including a generally cylindrical frame 104 having a radial front face 106 on which is centrally positioned a cylindrical boss 108, a cylindrical bore 110 extending axially through the frame 104 and the boss 108.

One end of a tubular frame 112 is received on the cylindrical boss 108 and is secured thereto by a plurality of screws 114, the screws 114 being covered by a collar 116. The tubular frame 112 is stationary relative to the housing 104, and functions to support a plurality of sets 118 of inner rollers 120. While only three sets of inner rollers 120 are shown in FIG. 9, it is to be understood that additional sets can be provided without departing from the invention.

As is best shown in FIGS. 12 and 13, the tubular housing 112 has a plurality of circumferentially spaced rectangular openings 122 therethrough for receiving the central portions of the rollers 120. Each of the rollers 120 has a reduced shaft 124 on its inner end and a similar shaft 126 on the outer end thereof, each of the inner shafts 124 having a hyperboloidal gear 132 secured thereto inwardly from its outer end. The tubular frame 112 has rectangular cut-outs 128 and 130 at the opposite ends of each of the openings 122 for receiving the shafts 124 and 126, respectively, and a larger cut-out 134 for receiving the gear 132, the diameter of the gear 132 being between the diameters of the inner shaft 124 and the main portion of its inner roller 120.

The rectangular openings 122 for receiving each set 118 of inner rollers 120 are circumferentially off-set from the openings 122 for receiving the adjacent set 118 of inner rollers as shown in the drawings. Further, the shaft-receiving openings 130 for receiving the outer shafts 126 on one set 118 of inner rollers 120 lie in the same plane as the shaft-receiving openings 128 for receiving the inner shafts 124 of the adjacent set 118 of inner rollers, as best shown in FIG. 12, the rectangular openings 128 and 130 of each annular array of such openings being substantially equally circumferentially spaced. Thus, the inner rollers 120 of one roller set 118 are circumferentially staggered relative to the inner rollers 120 of the adjacent roller sets.

An inner cylindrical collar 136 lies below each annular array of shaft receiving openings 128 and 130, and the associated inner and outer shafts 124 and 126 rest on said collar. A similar, outer cylindrical collar 138 is positioned over each annular array of openings 128 and 130, to secure the rollers 120 in assembled relationship to the tubular frame 112. The hyperboloidal gears 132 extend radially inwardly from the inner collars 136, as clearly shown in the drawings.

Each of the rollers 120 is disposed to be slightly oblique relative to the longitudinal axis of the tubular frame 112, as is perhaps best shown in FIG. 11. The rollers 120 are thus disposed like the inner rollers 14 of FIGS. 1–3 and the inner rollers 72 of FIGS. 5–7, so that they tend to move the helically wound pipe therealong. It should be noted that all of the inner rollers 14, 72, and 120 are angled in the direction in which the pipe rotates about the imaginary generally cylindrical surface which said rollers inscribe, whereby when said rollers are driven they tend to move the helically wound pipe axially therealong.

Journaled within the cylindrical bore 110 in the frame 104 is a cylindrical drive shaft 140, which extends forwardly through the tubular frame 112. Secured to the cylindrical drive shaft 140 by pins 141 are cylindrical sleeves 142, one for each set 118 of inner rollers 120. The inner end of each sleeve 142 has a hyperboloidal driving gear 144 thereon, each of the driving gears 144 being engaged with all of the hyperboloidal gears 132 of the associated inner rollers 120. Thus, when the shaft 140 is rotated in one direction, all of the inner rollers 120 in all of the sets 118 thereof will be rotated simultaneously in the opposite direction at identical speeds. The drive shaft 140 is driven by a motor or other suitable power source (not shown).

The frame 104 has an extension 146 thereon through which extends a rectangular opening 148, and a rectangular bushing block 150 corresponding to the block 34 in FIGS. 1–3 is mounted within said opening. The bushing block 150 has a cylindrical bore 152 therethrough, in which is journaled the reduced shaft portion 154 of an outer pressure roller 156 corresponding to the outer roller 40 in FIGS. 1–3. The roller 156 is resiliently urged toward the top-most of the inner rollers 120 disposed therebelow in the same manner as in FIGS. 1–3, the bolts 158 providing an adjustment for the resilient urging force. The rear end of the shaft portion 154 has a gear 160 mounted thereon in alignment with a gear 162 mounted on the drive shaft 140, the gears 160 and 162 being connected by a drive chain 164. Thus, the outer roller 156 will be rotated in a direction opposite to that of the inner rollers 120 when the drive shaft 140 is rotated.

The apparatus of FIGS. 9–13 functions similar to the apparatus of FIGS. 1–3 to form a pipe from a strip of extruded, not fully hardened resin material, the outer roller 156 having a pair of annular grooves 166 therein for receiving the rib on the strip of extruded material as it is helically fed onto the imaginary cylindrical surface inscribed by the inner rollers 120. The inner roller arrangement of FIGS. 9–13 gives the advantage that each of the inner rollers 120 can be made very short, and that the entire inner roller assembly can be made of any desired length to provide adequate support to the manufactured pipe. Each of the rollers 120 is carried by the stationary tubular frame 112, whereby force exerted on the inner rollers in the helical direction during the manufacturing process is taken up by the tubular frame without causing damage or distortion either to the apparatus or the finished product.

Referring now to FIGS. 14–17, an embodiment of the invention is shown for manufacturing plural layer synthetic resin pipe, with reinforcement between the layers. A supporting framework 200 has a bracket 202 thereon identical to the bracket 102 of FIGS. 9–13, and which supports an inner core assembly C comprising a plurality of sets 204 of inner rollers 206, mounted and arranged identically to the sets 118 of inner rollers 120 in FIGS. 9–13. Also carried by the bracket 202 is an outer or pressure roller 208, corresponding to the outer pressure roller 156 in FIGS. 9–13.

The inner rollers 206, like the inner rollers 14, 72 and 120, all inscribe an imaginary generally cylindrical surface at peripheral intervals of a suitably defined constant length, the axis of rotation of each roller 206 lying slightly oblique relative to the axis of the imaginary cylindrical surface. The plurality of arrays or sets 118 of inner rollers 206 are arranged one after the other, as taught in FIGS. 9–13, and support and move axially the helically wound plural layer pipe as it is being formed.

Mounted on the framework 200 rearwardly of the bracket 202 are spaced bearings 210 and 212, which support a drive shaft 214 corresponding to the drive shaft 140 in FIGS. 9–13. The drive shaft 214 has a pulley 216 thereon between the bearings 210 and 212, which is aligned with a pulley 218 mounted on the rear end of the outer roller 208, the pulleys 216 and 218 being connected by a belt 220. Alternatively, gears can be substituted for the pulleys 216 and 218, and a drive chain can then be substituted for the belt 220. The rear end of the drive shaft 214 has a pulley 222 thereon aligned with the outer groove on a dual-groove pulley 224 mounted on the output shaft of a motor 226 secured to the framework 200, the pulleys 222 and 224 being connected by a belt 228. When the motor 226 is energized the drive shaft 214 will thus be driven clockwise, as indicated by the arrow A, and the inner rollers 206 will correspondingly be driven in a counterclockwise direction, as indicated by the arrow B.

The framework 200 is constructed with a central cut-out 230 therein, and secured to said framework 200 to extend over said cut-off region 230 is a bracket 232 on which is supported a cylindrical bearing sleeve 234 containing a pair of axially spaced bearings 236. Slidably received within the bearings 236 and encircling the core assembly C in concentric relationship is a supporting sleeve 238, the inner diameter of the sleeve 238 being substantially greater than the maximum diameter of the core assembly C. The supporting sleeve 238 has a shoulder 240 thereon against which one of the bearings 236 is engaged, and is secured in assembled relationship by a snap ring 242.

Telescopically received on the forward end of the supporting sleeve 238 and secured by bolts 246 is a collar 244, said collar having a radially extending, circular, inner bobbin-supporting plate 248 thereon. The inner plate 248 has a plurality of circumferentially spaced, axially extending supporting shafts 250 mounted thereon to project from both sides of the plate, the supporting shafts 250 extending parallel to the longitudinal axis of the inner core assembly C and lying along a circle disposed concentrically of said axis. Mounted for free rotation on the supporting shafts 250 on the opposite faces of the circular inner plate 248 are bobbins 252.

Secured to the forward face of the inner bobbin-supporting plate 248 by bolts 254 is the annular flange 256 on a rear cylindrical guide sleeve 258, said guide sleeve 258 being positioned concentrically of and having a larger diameter than the sleeve 238. The outer end of the guide sleeve 258 has a plurality of circumferentially spaced, radial thread guide openings 260 extending completely around the periphery thereof. Thread 262 from the bobbins 252 mounted on the rear face of the inner plate 248 is passed through guide openings 263 in said plate, and then through alternate ones of the guide openings 260 in the guide sleeve 258. Similarly, thread 264 from the bobbins 252 on the front side of the plate 248 is passed through the remaining alternate ones of the guide openings 260.

The outer periphery of the inner bobbin-supporting plate 248 has a plurality of circumferentially spaced rollers 266 mounted thereon, on which is mounted an annular outer bobbin-supporting plate 268, the plate 268 having circumferentially continuous groove 270 in the inner face thereof defining a track for receiving the rollers 266. The horizontal portions 271 of a plurality of L-shaped, radially extending supporting arms 272 are connected to the front face of the annular outer plate 268, and the inner ends of the radially extending portions 273 of said L-shaped supporting arms are welded to a forward cylindrical guide sleeve 274 to support the same in concentric relationship about the core assmbly C. The inner end of the forward guide sleeve 274 is provided with a plurality of circumferentially spaced thread guide openings 276 about the periphery thereof, corresponding to the guide openings 260.

The outer bobbin-supporting plate 268 has a plurality of circumferentially spaced supporting shafts 278 mounted thereon to project from both faces of said plate, the shafts 278 extending parallel to the supporting shafts 250 and the longitudinal axis of the core assembly C. Mounted for free rotation on the opposite ends of each supporting shaft 278 are bobbins 280, thread 282 from the bobbins 280 on the rear face of the outer plate 268 passing through thread guide openings 284 provided in said plate, through thread guides 286 mounted on the radial arms 272, and then through alternate ones of the guide openings 276 in the outer guide sleeve 274. Similarly, thread 288 from the bobbins 280 on the front face of the outer plate 268 is passed through the guides 286, and then through the remaining alternate ones of the guide openings 276.

The supporting sleeve 238 has a pulley 290 on the rear end thereof, which is vertically aligned with a pulley 292 mounted on a shaft 294 carried by the framework 200. The shaft 294 extends parallel to an intermediate drive shaft 296 also mounted on the framework 200, the shafts 294 and 296 being drivingly connected by gears 298 and 300, respectively, mounted thereon. The pulleys 290 and 292 are connected by a belt 291. The rear end of the intermediate drive shaft 296 has a pulley 302 thereon aligned with the inner groove on the dual-groove pulley 224, and the pulleys 224 and 302 are connected by a belt 304. Thus, when the motor 226 is operating the supporting sleeve 238 will be driven in a counter-clockwise direction about the inner core assembly C, as indicated by the arrow D, which is the same direction of rotation as for the inner rollers 206. When the supporting sleeve 238 is rotated the circular inner bobbin supporting plate 248 and the bobbins 252 mounted thereon will revolve therewith.

The outer peripheral surface of the outer bobbin-supporting circular plate 268 has a circumferentially continuous groove 306 therein that defines a pulley, said plate being aligned with a pulley 308 mounted on a shaft 310 carried by the framework 200. The shaft 310 has a gear 312 on the rear end thereof in meshing engagement with a gear 314 carried by the intermediate drive shaft 296. Another belt 318 connects the pulley 308 with the bobbin-supporting plate 268, and thus when the intermediate drive shaft 296 is rotated by the motor 226 the outer annular plate 268 will be driven in a counter-clockwise direction, as indicated by the arrow E.

Mounted adjacent to the inner core assembly C are extruders 320 and 322, the extruder 320 being positioned to supply material to the outer roller 208 disposed on the rear side of the bobbin-supporting apparatus, and the extruder 322 being positioned on the forward side of the bobbin-supporting apparatus. An outer pressure roller 324 is mounted on the framework 200 to cooperate with the extruder 322 and the inner core assembly C, and functions like the outer pressure roller 208. The pressure roller 324 is driven by a belt 326 from a pulley 328 on an intermediate drive shaft 316, which also carries a gear 314′ secured thereto in meshing engagement with a gear 312′ on the shaft 310.

In operation, the motor 226 is started to effect: (1) rotation of the inner rollers 206 in a counter-clockwise direction; (2) rotation of the outer rollers 208 and 324 in a clockwise direction; (3) rotation of the inner bobbin-supporting plate 248 in a counter-clockwise direction; and (4) rotation of the outer bobbin-supporting plate 268 in a counter-clockwise direction. A strip of not fully hardened synthetic material is then supplied continuously from the extruder 320, and is helically wound on the inner core assembly C, the outer pressure roller 208 functioning to weld together the overlapping lateral edges of said helically wound strip 320 to thereby form an inner pipe layer 332.

The apparatus of FIGS. 14–17 is designed to helically wind the threads 262 and 264 in one direction about the inner pipe layer 332, and to helically wind the threads 282 and 288 in the opposite direction, whereby to form a tubular netting-like reinforcement. To accomplish this one of the bobbin-supporting plates 248 and 268 must be rotated at a relatively greater speed, and the other plate must be rotated at a relatively slower speed, than the speed of rotation of the inner pipe layer 332. Further in order to produce the preferable uniform diamond-shaped netting openings shown in the drawings, the speed of the bobbin-supporting plates 248 and 268 relative to the inner pipe layer 332 must be substantially identical in value.

The rate of axial advancement of the helically wound inner pipe layer 332 is relatively slow, say only about 5 to 10 millimeters for each complete turn of a pipe layer 332 having a diameter of about 5 centimeters. To produce the relatively open, diamond-shaped configuration for the reinforcing threads shown in the drawings under such conditions it is necessary that the difference between the rotational speeds of the relatively oppositely rotating bobbin-supporting plates 248 and 268 and the rotational speed of the pipe inner layer 332 be but a very small fraction, say about 3% to 6%, of the rotational speed of the inner pipe layer 332. To obtain this speed relationship in the invention both of the bobbin-supporting plates 248 and 268 are rotated in the same counter-clockwise direction about the inner pipe layer 332, which direction is the same as the direction of rotation of said layer 332, one of the bobbin-supporting plates being rotated slightly faster and the other being rotated slightly slower than the inner pipe layer 332 to obtain the desired relative opposite rotation. Preferably, the value of the relative speeds of the two supporting plates 248 and 268 is identical to provide the diamond-shaped reinforcement configuration, it being possible to vary the reinforcement configuration by varying the values of said relative speeds.

The inner pipe layer 332 rotates and advances forwardly along the inner core assembly C, and passes through the rear guide sleeve 258 of the rotating inner bobbin assembly, wherein the threads 262 and 264 are wrapped in one direction about the inner pipe layer 332 to form a helical winding thereon, as shown in FIG. 15. The inner pipe layer 332 then moves forwardly from the rear guide sleeve 258 into the forward guide sleeve 274, wherein the threads 282 and 288 are wrapped in the opposite direction thereabout. The threads 262, 264, 282 and 288 are thus helically wound in a uniform manner and under uniform tension on the inner pipe layer 332 to present the appearance of tubular netting, said threads forming a reinforcement about the inner pipe layer 332.

It is obvious that the outer bobbin-supporting plate 268 could be driven at a speed slower than the speed of the inner pipe layer 332, and the inner plate 248 at a faster speed, or vice versa, if desired resulting in the same diamond-shaped, netting-like reinforcement layer. In any case, the values of the relative speeds of the relatively oppositely rotating plates would preferably be substantially identical, to produce the desired diamond-shaped netting openings.

After the inner pipe layer 332 with the reinforcement threads thereon leaves the forward guide sleeve 274 it moves into the region of the outer extruder 332, which supplies a continuous strip 334 of not fully hardened synthetic resin material. The strip 334 is helically wound about the inner layer 332 and the reinforcement threads, the lateral edges thereof being overlapped and being welded together by the outer pressure roller 324 to thereby form an outer pipe layer 335 and produce a finished plural layer reinforced pipe 336.

The steps for producing the plural layer reinforced pipe 336 are diagrammatically illustrated in FIGS. 18–21, wherein first (FIG. 18) the strip of material 330 is formed into the inner pipe layer 332. Then, as shown in FIG. 19, the threads 264 and 262 are helically wrapped in one direction about the inner pipe layer 332, following which the threads 282 and 288 are helically wrapped in the other direction about the inner pipe layer 332 (FIG. 20) to complete formation of the tubular netting-like reinforcement layer. The strip of material 334 is then wrapped about the threads and the inner pipe layer 332 to form the outer pipe layer 335 (FIG. 21), thus completing the pipe 336. A partially broken-away portion of the completed pipe 336 is shown in FIG. 22.

The method and apparatus of FIGS. 14–21 for producing the pipe 336 have the advantages that a strong and yet highly flexible continuous synthetic resin pipe 336 with helically wound reinforcement threads embedded therein can be easily manufactured in a continuous manner, with no significant fluctuation in local strength throughout the length of the pipe because of the uniform manner in which the strips of material 330 and 334 and the reinforcement threads 262, 264, 282 and 288 are placed. Further, the apparatus of FIGS. 14–17 is compact because the rotating plates 248 and 268 supporting the inner and outer bobbins lie in substantially the same radial plane, and because the bobbin assembly remains in a stationary position along the axis of the inner core assembly C.

The apparatus of FIGS. 14–17 can also be used to produce pipe of other configurations, such as those shown at 338, 340 and 342 in FIGS. 23–25, respectively.

Both the outer pressure roller and the array of inner rollers are driven in the various embodiments of the invention that have been shown and described, this being the preferable arrangement. However, in some instances it may be sufficient to drive only one of the outer rollers and the array of inner rollers. Further, if desired the outer rollers can be made substantially longer than shown herein to apply pressure over a plurality of turns of the helically wound strip of material, whereby to effect a better weld between the overlapped edges.

It is seen that the method and apparatus of the invention as shown and described fully satisfies all of the objects hereinabove set forth. Obviously, many modifications and variations of the present invention are possible in the light of the above teachings. It is, therefore, to be understood that within the scope of the appended claims the invention may be practiced otherwise than as specifically shown and described.

I claim:

1. Apparatus for continuously manufacturing synthetic resin pipe, comprising: a supporting frame; at least one annular array of circumferentially spaced inner rollers carried by said frame and being arranged to inscribe an imaginery cylindrical surface, each of said inner rollers being mounted for rotation about an axis disposed slightly oblique to the longitudinal axis of said imaginery cylindrical surface in the peripheral direction thereof, with uniform deviation from said longitudinal axis for every one of said inner rollers; an outer roller rotatably mounted radially outwardly of at least one of the inner rollers of said annular array in opposing relation thereto, the axis of said outer roller extending substantially parallel to the axis of rotation of said opposing inner roller; and driving means for rotating at least one of said annular array of inner rollers and said outer roller, said annular array of inner rollers being adapted to receive thereon in helically wound relationship a strip of synthetic resin material, said strip of material being fed in a generally tangential direction between said outer roller and the opposed one of said inner rollers and being moved axially forwardly on said annular array of inner rollers as the driven ones of said rollers are rotated.

2. Apparatus as claimed in claim 1, wherein the inner rollers are each constructed to taper downwardly moving forwardly from said opposed outer and inner rollers.

3. Apparatus as claimed in claim 1, wherein the inner rollers each have a plurality of annular grooves thereon spaced apart in the axial direction thereof, each of said annular grooves of one of said inner rollers being axially displaced relative to the corresponding groove of the preceding inner roller by the amount of the axial advancement of the strip of helically wound synthetic resin material during its travel between said inner rollers.

4. Apparatus as claimed in claim 3, further including an endless cord wound over said annular array of inner rollers about and along the same helical path as said strip of synthetic resin material; and means for driving said endless cord.

5. Apparatus as claimed in claim 1, wherein a plurality of annular arrays of inner rollers are carried by said supporting frame, said arrays being disposed one after another along the longitudinal axis of said imaginery cylindrical surface.

6. Apparatus as claimed in claim 5, wherein the inner rollers of all of said arrays are each supported by a stationary tubular frame for rotation about their respective axes, with a portion of the peripheral surface of each inner roller protruding from the surface of said tubular frame, said tubular frame being connected at one end thereof to said stationary supporting frame.

7. Apparatus as claimed in claim 6, including additionally: first extruder means for supplying a first continuous strip of synthetic resin material to a first location on said inner rollers, for forming a first layer of pipe; second extruder means for supplying a second continuous strip of synthetic resin material to a second location on said inner rollers spaced axially apart from said first location, for forming a second layer of pipe; and means between said first and said second extruder means for wrapping reinforcement threads about said first pipe layer while said first pipe layer is rotating and moving axially along said inner rollers.

8. Apparatus as claimed in claim 7, wherein said reinforcement thread wrapping means comprises: a rotatably mounted sleeve coaxial with said imaginary cylindrical surface inscribed by said inner rollers; a radially extending inner bobbin-supporting plate secured to said sleeve; a first plurality of bobbins carried by said inner supporting plate at places radially outwardly of said sleeve; an outer bobbin-supporting plate carried by said inner bobbin-supporting plate radially outwardly thereof and concentrically of said imaginary cylindrical surface, said outer plate being mounted for free rotation relative to said inner plate about said imaginery cylindrical surface; a second plurality of bobbins carried by said outer plate; means for guiding threads from all of said bobbins to said imaginary cylindrical surface; and driving means for rotating said inner plate for wrapping threads from said first plurality of bobbins in one direction about said first pipe layer, and for rotating said outer plate for wrapping threads from said second plurality of bobbins in the opposite direction about said first pipe layer.

9. Apparatus as claimed in claim 8, wherein said driving means is arranged to rotate said inner plate and said outer plate in the same direction about said first pipe layer, said direction being the same as the direction of rotation of said first pipe layer, one of said plates being rotated slightly faster and the other being rotated slightly slower than the speed of rotation of said first pipe layer.

10. Apparatus as claimed in claim 9, wherein said driving means is arranged to drive said plates so that the speeds thereof relative to the rotational speed of said first pipe layer are substantially identical in value.

References Cited

UNITED STATES PATENTS

| | | | |
|---|---|---|---|
| 2,398,876 | 4/1946 | Bailey | 156—428 XR |
| 2,539,853 | 1/1951 | Meyers et al. | 156—428 XR |
| 2,723,705 | 11/1955 | Collins | 156—195 XR |
| 2,748,830 | 6/1956 | Nash et al. | 156—432 XR |
| 3,306,797 | 2/1967 | Boggs | 156—171 |

BENJAMIN R. PADGETT, Primary Examiner

U.S. Cl. X.R.

156—173, 392, 428, 430